J. SPEESE.
ROTOR AND CASING FOR ROTARY ENGINES.
APPLICATION FILED AUG. 1, 1910.

1,180,200.

Patented Apr. 18, 1916.
4 SHEETS—SHEET 1.

Witnesses
Frank B. Hofman
Wm. Bagger

Inventor
Jasper Speese
By Victor J. Evans
Attorney

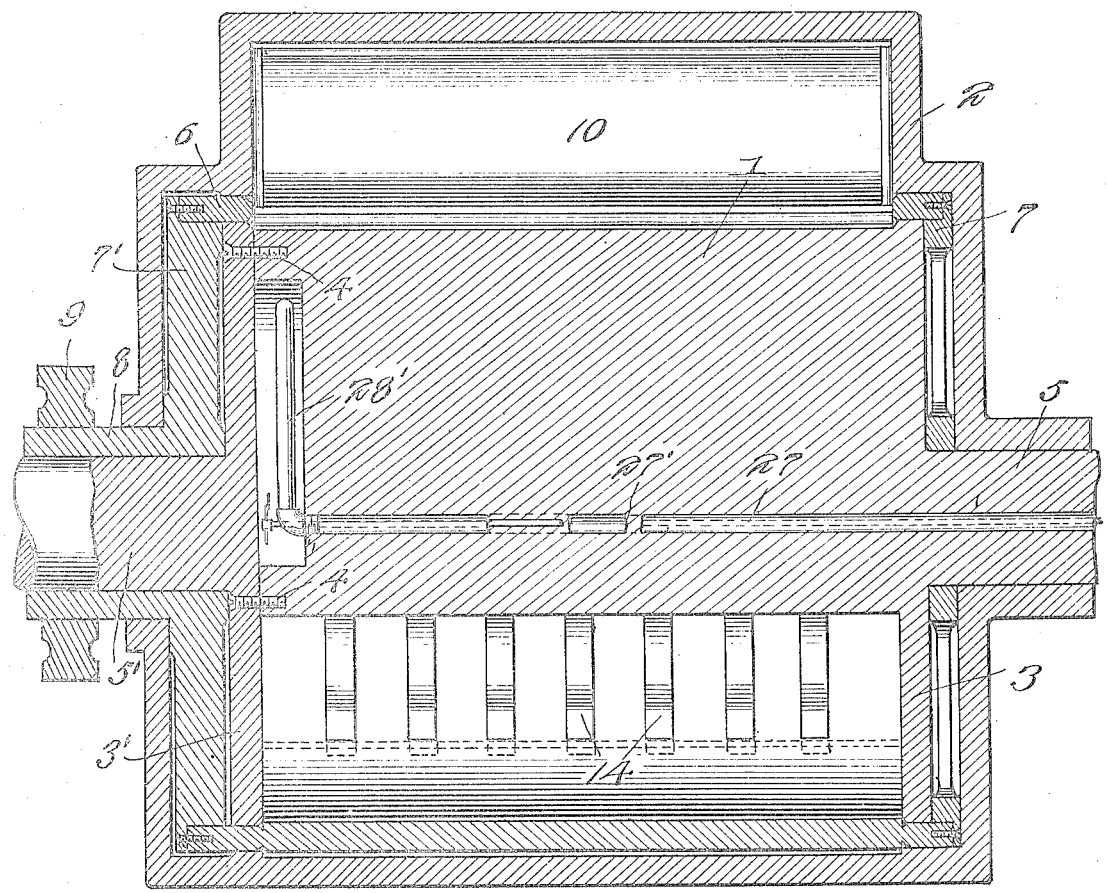

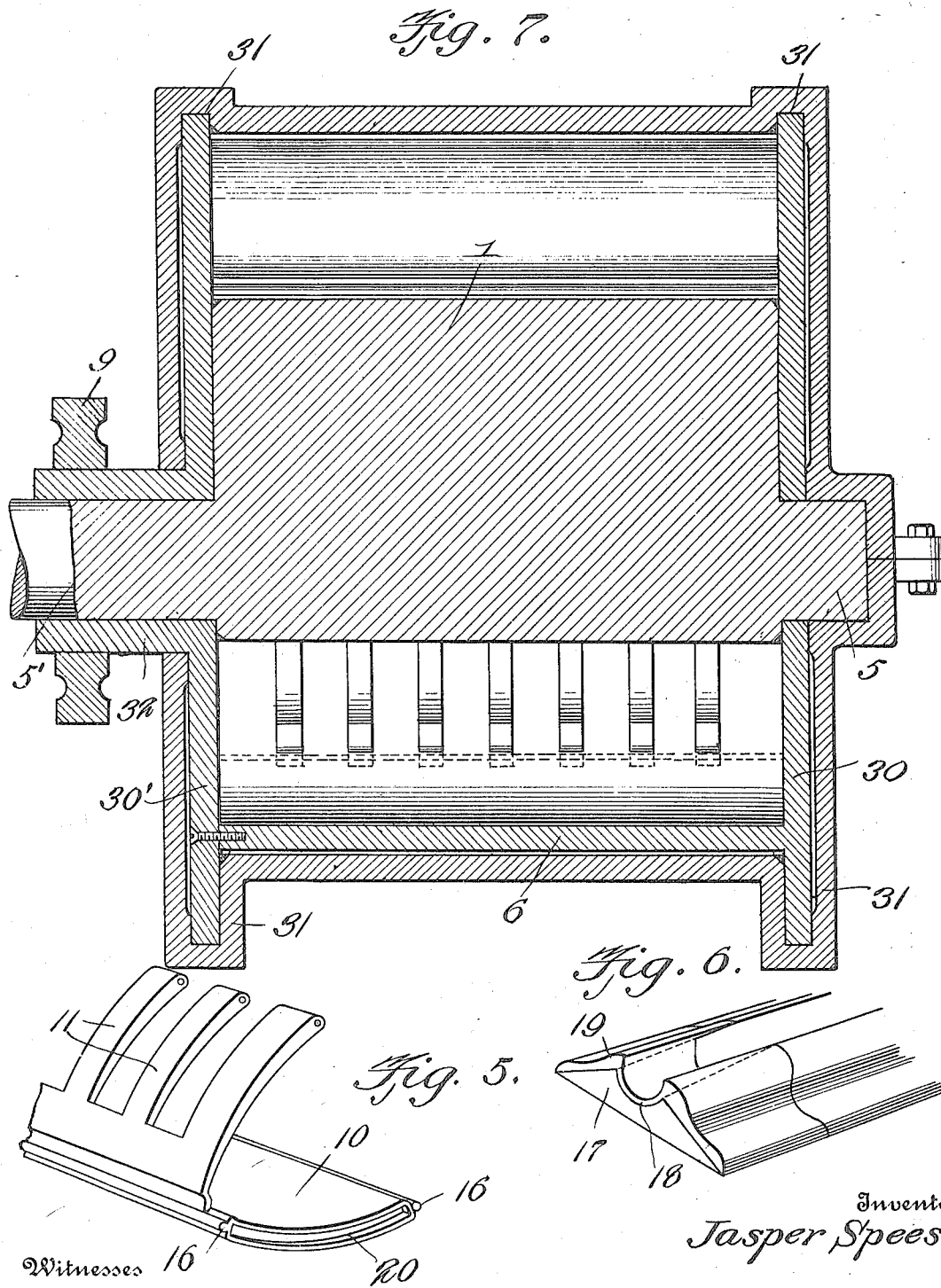

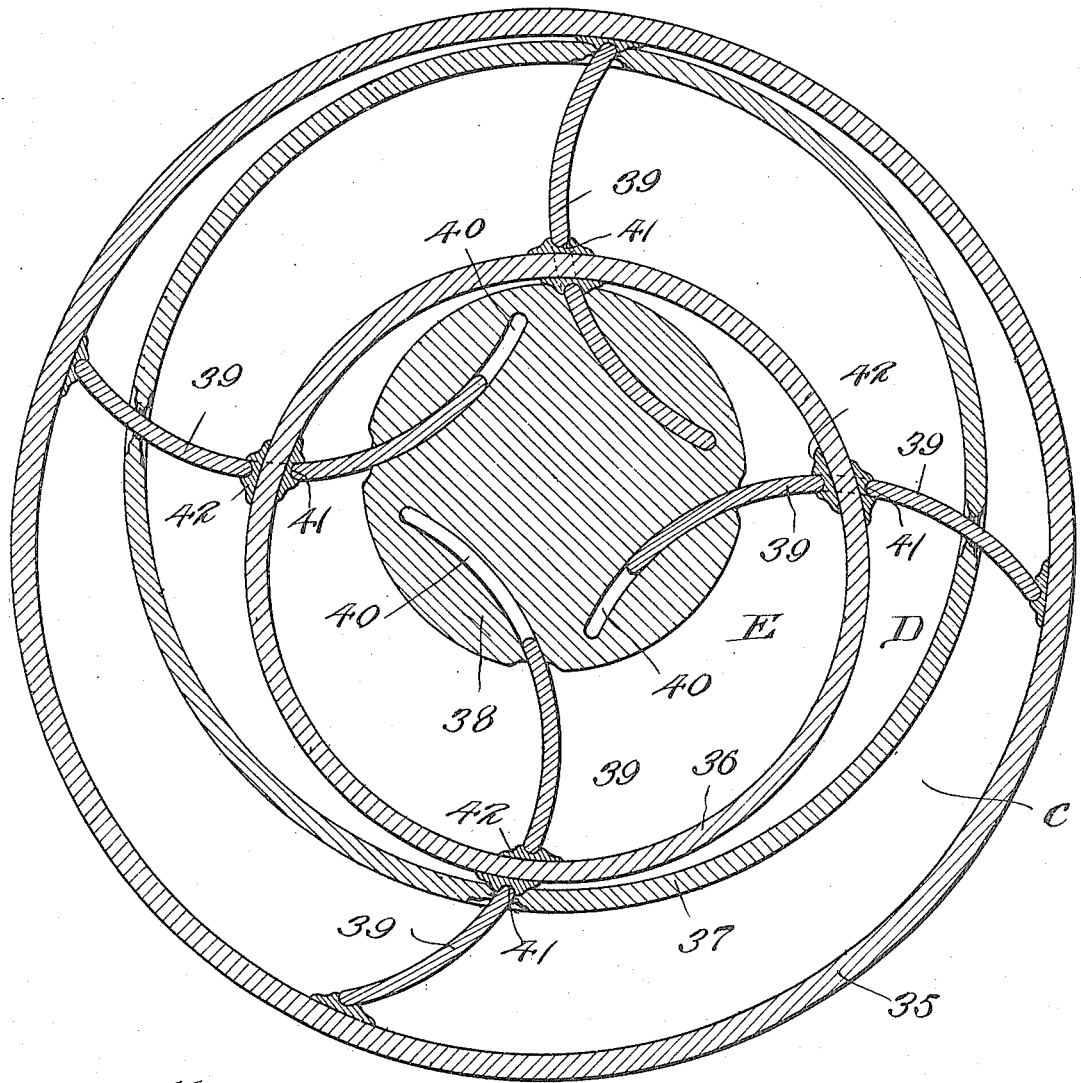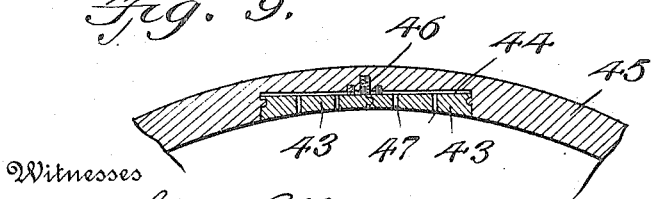

UNITED STATES PATENT OFFICE.

JASPER SPEESE, OF WEST MILTON, PENNSYLVANIA.

ROTOR AND CASING FOR ROTARY ENGINES.

1,180,200.

Specification of Letters Patent. Patented Apr. 18, 1916.

Application filed August 1, 1910. Serial No. 574,788.

*To all whom it may concern:*

Be it known that I, JASPER SPEESE, a citizen of the United States of America, residing at West Milton, in the county of Union and State of Pennsylvania, have invented new and useful Improvements in Rotors and Casings for Rotary Engines, of which the following is a specification.

This invention relates to rotary engines, and especially to rotary engines of that class in which a rotor or hub supported for rotation in a casing is equipped with movably supported blades or piston wings adapted to be exposed to the impact of the energizing medium utilized in operating the engine.

The invention has for its object to produce a construction of the rotor and casing which in all essential details shall be applicable to many forms of rotary engines whether driven by steam, compressed air, water or other liquids under pressure, or by any other fluid pressure used expansively or otherwise, or whether the said engine be of the form known as an explosive or internal combustion engine in which the piston wings or blades are exposed to the force of an explosion of gas or explosive mixture; a further object of the invention being to provide a construction whereby the greatest possible area of the piston wings shall be exposed to the action of the energizing medium, thereby insuring the greatest possible degree of efficiency commensurate with the dimensions of the engine.

With these and other ends in view which will readily appear as the nature of the invention is better understood, the same consists in the improved construction and novel arrangement and combination of parts hereinafter fully described and particularly pointed out in the claims.

In the accompanying drawings has been illustrated a simple and preferred form of the invention, it being, however understood that no limitation is necessarily made to the precise structural details therein exhibited, but that changes, alterations and modifications within the scope of the claims may be resorted to when desired.

Figure 1:
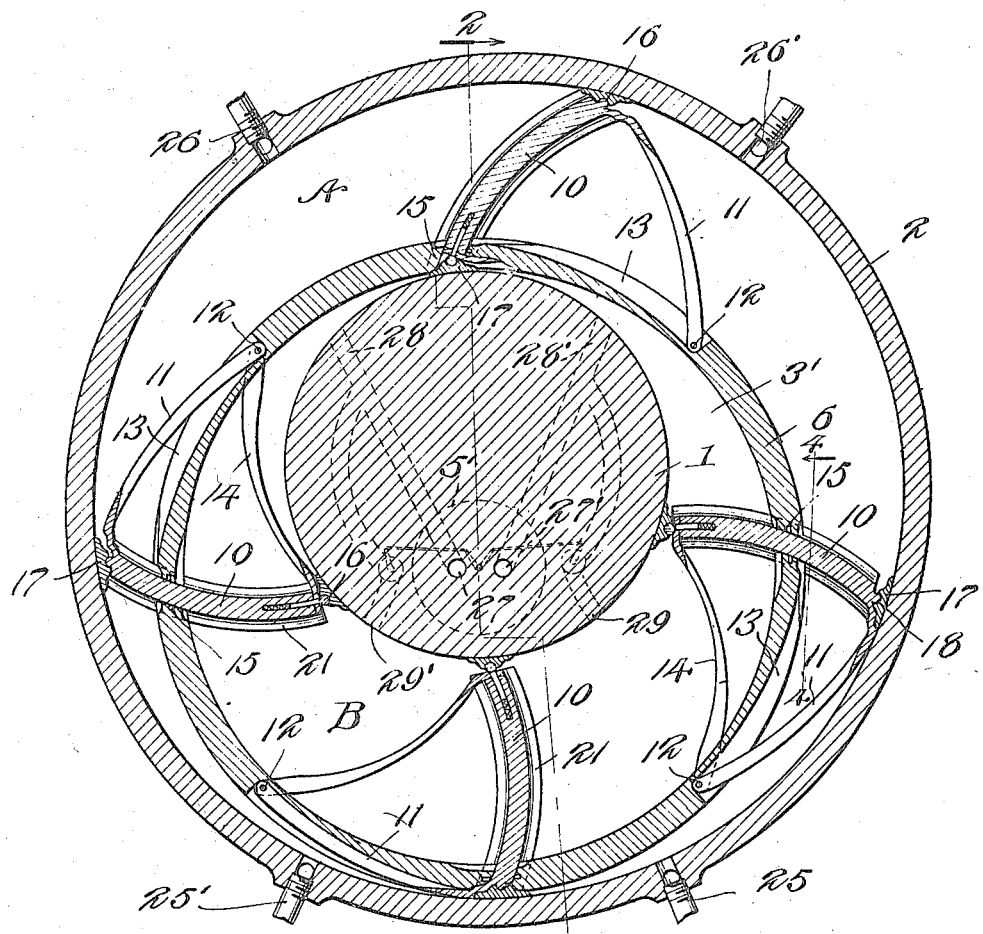
Figure 4:
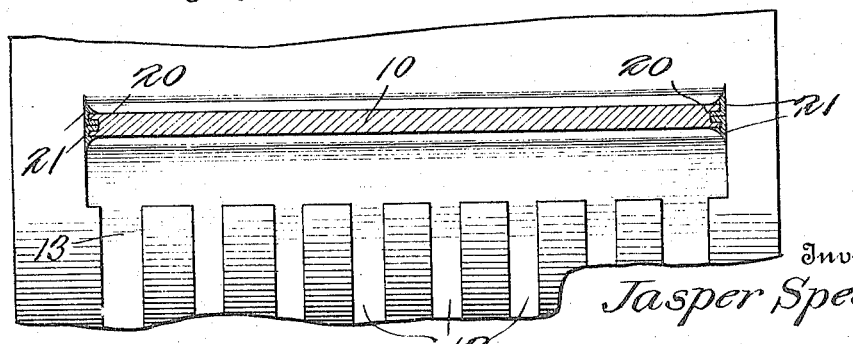

In the drawings,—Figure 1 is a vertical sectional view illustrating a simple and preferred form of the invention. Fig. 2 is a vertical transverse sectional view taken on the line 2—2 in Fig. 1. Fig. 3 is a detail view in elevation, showing one of the piston wings with its shoe 17 and carrying arms 11, 14, detached. Fig. 4 is a sectional detail view taken on the line 4—4 of Fig. 1. Fig. 5 is a perspective detail view of a portion of one of the piston wings. Fig. 6 is a perspective detail view, enlarged, showing a portion of the shoe carried by the wing. Fig. 7 is a vertical sectional view illustrating a modification. Fig. 8 is a vertical sectional view illustrating a further modification of the invention. Fig. 9 is a sectional detail view illustrating a simple form of packing which may be advantageously used in connection with the invention.

Corresponding parts in the several figures are denoted by like characters of reference.

Referring more particularly to Figs. 1 and 2 of the drawings, 1 designates a cylindrical core or casting which is supported eccentrically within a casing 2, said core being provided at the ends thereof with eccentric flanges 3, 3', the former of which has been shown integral with the core, while the latter flange, for convenience in making and assembling, is detachably connected with the core by fastening members, such as screws 4. The core is provided with shaft members 5, 5', the former of which is integral with the core, while the latter shaft member is formed upon the detachable flange member 3'. These shaft members are disposed eccentrically with reference to the core, but concentrically with reference to the flange members 3, 3' and in axial alinement with one another.

The rotor consists of an annular hub 6 which is supported for rotation about the flanges 3, 3', the inner face of said hub being nearly in contact with the core, while the outer face of the rotor at a diametrically opposite point is nearly in contact with the inner wall of the casing 2. The said casing, it will be observed, combines with the core to form an annular chamber in which the annular rotor is supported for rotation in such a manner that the said annular chamber will be thereby subdivided into two crescent-shaped compartments, one of which, A, is bounded by the inner face of the casing wall and the outer face of the rotor, while the other compartment, B, is bounded by the core and the inner face of the rotor. The eccentric flanges 3, 3' of the core serve to maintain the rotor in its proper relative position with reference to the core and the casing. The length of the rotor exceeds that of the core, the projecting ends being supported by means of wheels or disks, one of which, 7, is mounted for rotation upon the shaft member 5 within the casing, while the other supporting wheel or disk, 7', is provided with a sleeve or flange 8 rotatably engaging the shaft member 5' and extending through the casing, said sleeve being adapted to carry transmission means, such as a band wheel 9 for transmitting motion.

The rotor 6 is provided with longitudinal slots for the passage of the piston wings or blades 10. These blades, which are of arcuate form, are provided with arms or supporting members 11 pivotally connected at 12 with the rotor, the outer face of the latter being provided with recesses 13 for the accommodation of said arms. It may be found desirable to supplement the arms 11 by braces 14 extending from the inner ends of the blades to the rotor with which said braces are pivotally connected by means of the pivots 12. It is obvious that the curvature of the piston wings or blades must be concentric with the pivots 12 so that the said wings or blades will be capable of moving freely through the slots in the rotor, said slots being indicated at 15. It will also be understood that the inner face of the rotor is to be recessed for the accommodation of the braces 14 when the latter are used.

As will be understood from the foregoing description and by reference to the drawings, the piston wings or blades, as they are carried about by the rotation of the rotor hub within the casing, will operate through the rotor hub and between the outer face of the core and the inner face of the casing wall, thus extending transversely through the compartments A and B. It will be further observed that when the piston wings are projected outwardly with reference to the rotor, they must of necessity be positioned at a different angle with reference to the rotor than when they are projected inwardly from the latter; hence the necessity for positioning the core 1 eccentrically with reference to the casing to produce the annular chamber of eccentric conformation between the core and the casing which in any position of the rotor will be transversely obstructed by each of the piston wings, and it follows that each of the compartments A and B will likewise be transversely obstructed by each of the piston wings in any position of the rotor, excepting at the points where the rotor contacts with the core and the casing, respectively.

The piston wings are provided at their inner and outer ends with ribs 16 having arcuate faces and undercut edges for the purpose of carrying shoes 17 having arcuate grooves 18 engaging the ribs upon which the said shoes are supported for rocking or oscillatory movement. The shoes are provided adjacent to their ends with resilient clips 19 serving to retain the shoes upon the ribs and to exert pressure against said shoes, whereby they will be held resiliently in contact with the inner face of the casing and the outer face of the core, respectively, forming steam tight joints. The end edges of the piston wings are provided with grooves 20 for the reception of suitably constructed packing strips or members 21 engaging the end walls of the compartments A and B.

The steam or other fluid gas or explosive mixture whereby the engine is to be driven is to be introduced into and exhausted from the compartments A and B independently, and to regulate the introduction and the exhaust of such fluid any suitable valve system may be applied. In Fig. 1 I have shown the casing 2 provided with ports 25, 25' adjacent to opposite sides of the point of contact of the casing with the rotor and opening into the compartment A, and additional ports 26, 26' are provided at points which are nearly diametrically opposite to the ports 25 and 25', respectively. The core 1 is bored to form ducts 27, 27' and ports or passages 28, 28' opening into the compartment B adjacent to opposite sides of the point of contact of the rotor with the core. Valved exhaust ports or passages 29, 29' arranged nearly diametrically opposite to the ports 28, 28' connect the chamber B with the ducts 27, 27' through the ports or passages 28, 28'. Valves and valve regulating means are provided whereby the exhaust ports 26, 29 from the compartments A, B may be simultaneously obstructed, while the exhaust ports 26', 29' from said compartments are open, or vice versa. The ports 25, 25' and 28, 28' on the other hand are to be equipped with valve means enabling them to be alternately utilized as inlet ports and as exhaust ports, according to the direction of rotation.

The several inlet ports are to be located as closely as convenient adjacent to the points of contact of the rotor with the casing and the core, in order that the motive fluid may become effective at the earliest possible moment. The location of the exhaust ports will be governed by the distance between the wings 10 of which any desired number may be used, four having been shown for purposes of illustration, and said wings being approximately equidistantly apart. The exhaust ports are so positioned that at the moment when an exhaust port is uncovered by the shoe 17 of one of the wings, and the exhaust of fluid contained in the space between that wing and the one next behind begins to take place, approximately the same area of the two wings shall be exposed between the inner and outer walls of the crescent-shaped compartments A or B, as the case may be, it being also understood that the widest portion of the compartment, or that of greatest cross sectional area, is located intermediate and about midway between the wings when in this position. It follows that the motive fluid will have room to expand, and that the exposed area of the first wing being in excess of that of the second or following wing, until the moment when exhaust begins to take place, the expansion of the motive fluid will be effective to turn the rotor in the proper direction until the exhaust begins, at which time equilibrium is established between the two wings. Thus, it will be seen that the expansive force of the motive fluid is effectively utilized until the exhaust begins.

Assuming that steam is admitted to the compartments A and B through the ports 25, 28, the steam will act upon those portions of some of the piston wings which transversely obstruct the compartments A and B in advance of the inlet ports, thus causing the rotor to rotate and carrying the piston wings past the exhaust ports 26′ and 29′, which are meanwhile closed or obstructed, and eventually past the exhaust ports 26 and 29 which are open to the exhaust. A portion of the spent fluid which is carried around by the piston wings will eventually be discharged through the ports 25′ and 28′ which at this time are open to the atmosphere. By admitting the fluid through the ports 25′ and 28′, the direction of rotation will be reversed, and the spent fluid will be exhausted through the ports 26′, 25 and 29′, 28, respectively.

In Fig. 7 of the drawings there has been illustrated a slight modification which consists in dispensing with the eccentric flanges 3, 3′ upon the core 1, and in lieu thereof providing the rotor 6 with eccentric flanges, here designated 30, 30′, whereby said rotor is guided for rotation within the casing, which latter is constructed with grooved offsets 31 for the accommodation of portions of said flanges. The flanged portion 30′ is provided with a sleeve 32 that extends through the casing and carries a band wheel 9. In other respects, the construction and operation are substantially as hereinbefore described, it being understood that suitable inlet and exhaust ports and a suitable system of regulating valves are to be provided.

In Fig. 8 of the drawings has been illustrated a further modification of the invention under which stationary annular casing members 35, 36 are provided to form an annular chamber wherein the rotor 37 is accommodated, said rotor being eccentrically disposed and contacting at one point with the inner face of the outer casing wall and at an opposite point with the outer face of the inner casing wall. A revoluble hub or core 38 is provided, said core being operatively connected with the rotor for rotation therewith. The piston wings 39 in this form of the invention are carried jointly by the rotor 37 and the core 38, the latter being provided with arcuate recesses 40 for the reception of the inner ends of the arcuate piston wings, and the latter are provided with slots 41, whereby they are guided upon the inner casing member 36; steam tight joints being provided by means of suitably constructed packing members 42. It will be seen that under this form of the invention three separate crescent shaped compartments, designated, respectively, C, D and E are provided, each of which is to be connected through the medium of suitable ports with the source of supply of fluid or other energizing medium and with the atmosphere for the exhaust of the spent fluid. It is obvious that in this as in the forms of the invention previously described, the greatest possible area of the piston wings may be effectively exposed to the action of the energizing medium, thus insuring the development of the greatest amount of power at the smallest possible expense and by the use of an engine of the smallest dimensions.

In Fig. 9 I have illustrated a form of packing which may be advantageously employed at the various points of contact between the rotor and the casing or the core, as the case may be. Said packing comprises a pair of strips 43 hingedly connected together in any convenient manner and seated in a recess 44 in the casing member, here designated 45. Light springs 46 are employed to force the packing strips outwardly for effective engagement with the rotor, and said packing strips are provided with apertures 47 to enable the pressure of the energizing liquid to be equalized about the strips.

From the foregoing description, taken in connection with the drawings hereto annexed, the operation and advantages of this invention will be readily understood by those skilled in the art to which it appertains. The arrangement of ports and ducts for the inlet of the live motive fluid and for the exhaust of the spent fluid may obviously be changed and modified in many respects, according to the nature of the fluid employed and the manner of using the engine. The engine structure may likewise be modified in many of its mechanical details, provided, of course, that the salient features set forth in the claims are retained.

It will be understood that under the construction and arrangement of parts herein described it would be feasible to invert the operation of the device. That is to say, it would be possible to install ducts and valves in such a manner that the parts heretofore referred to as being stationary would constitute the rotor, while the part hereinbefore referred to as the rotor would be suffered to remain stationary. Such an arrangement would not in any respect affect the construction of the parts constituting the invention in this case, which, as stated at the outset, consists broadly in the construction of a rotor and casing and applicable to any of the many forms of rotary engines that are driven by fluid pressure or by internal combustion resulting in the explosion of gases or explosive mixture.

I desire it to be distinctly understood that no limitation whatever is intended in the manner of utilizing the invention, but that any manner of using the same may be adopted which shall be productive of satisfactory results.

Having thus described the invention, what is claimed as new, is:—

1. A chamber having inner and outer walls disposed in eccentric relation, a rotor supported eccentrically for rotation in said chamber which is thereby divided into two crescent-shaped compartments, equidistant arcuate piston wings associated with the rotor hub and slidable therethrough to transversely obstruct the compartments adjacent to the rotor hub, inlet ports closely adjacent to the points of contact of the rotor with the casing and the core, and exhaust ports positioned at a distance in advance of the portion of the crescent-shaped compartments of greatest cross sectional area approximately equal to one-half the distance between two proximate wings, causing equilibrium to be established between the wing on an exhaust port and the next following wing at the time when exhaust begins to take place.

2. A chamber having inner and outer walls disposed in eccentric relation, a rotor supported eccentrically for rotation in said chamber which is thereby divided into two crescent-shaped compartments, equidistant arcuate piston wings associated with the rotor hub and slidable therethrough to transversely obstruct the compartments adjacent to the rotor hub, inlet ports closely adjacent to the points of contact of the rotor with the casing and the core, and exhaust ports positioned at a distance in advance of the portion of the crescent-shaped compartments of greatest cross sectional area approximately equal to one-half the distance between two proximate wings, causing equilibrium to be established between the wing on an exhaust port and the next following wing at the time when exhaust begins to take place; said piston wings being provided with arms pivotally connected with the rotor hub.

3. A chamber having inner and outer walls disposed in eccentric relation, a rotor consisting of an annular hub supported for rotation in said chamber which is thereby divided into two crescent-shaped compartments, said hub being provided with longitudinal slots, equidistant arcuate piston wings operating slidably through the slots of the rotor hub, and transversely obstructing the crescent-shaped compartments, arms connected with the wings and pivoted upon the rotor hub concentrically with said arcuate wings, inlet ports closely adjacent to the points of contact of the rotor with the casing and the core, and exhaust ports positioned at a distance in advance of the portion of the crescent-shaped compartments of greatest cross sectional area approximately equal to one-half the distance between two proximate wings, causing equilibrium to be established between the wing on an exhaust port and the next following wing at the time when exhaust begins to take place.

4. Two relatively stationary eccentrically disposed members combining to form a chamber, a rotor of annular shape supported eccentrically in the chamber with opposite portions in approximate contact with the inner and outer walls of said chamber, equidistant arcuate piston wings supported for reciprocation through the eccentrically disposed rotor to transversely obstruct the compartments of the chamber at opposite sides of said rotor, inlet ports closely adjacent to the points of contact of the rotor with the casing and the core, and exhaust ports positioned at a distance in advance of the portion of the crescent-shaped compartments of greatest cross sectional area approximately equal to one-half the distance between two proximate wings, causing equilibrium to be established between the wing on an exhaust port and the next following wing at the time when exhaust begins to take place.

5. In a rotary engine, a casing, a core supported eccentrically within the casing and combining therewith to form an annular chamber, a rotor mounted for rotation in said chamber in approximate contact with the inner wall of the casing and the outer wall of the core, said annular rotor being provided with longitudinal slots, equidistant arcuate piston wings operating through said slots, and arms associated with said piston wings and connected pivotally with the rotor, concentrically with relation to the arcuate piston wings, said casing and core being provided with inlet ports closely adjacent to the points of contact of the rotor with the casing and the core, and exhaust ports positioned at a distance in advance of the portion of the crescent-shaped compartments of greatest cross sectional area approximately equal to one-half the distance between two proximate wings, causing equilibrium to be established between the wing on an exhaust port and the next following wing at the time when exhaust begins to take place.

6. A chamber having inner and outer walls disposed in eccentric relation, a rotor operative in said chamber and permanently dividing the same into two crescent-shaped compartments, equidistant wings operative through the rotor and dividing each of said compartments into a plurality of permanently disconnected spaces, inlet ports in simultaneous communication with a space of each compartment, said inlet ports being situated closely adjacent to the points of contact of the rotor with the walls of the annular chamber, and exhaust ports in simultaneous communication with a space of each compartment, said exhaust ports being positioned at a distance in advance of the portions of the crescent-shaped compartments of greatest cross sectional area approximately equal to one-half the distance between two proximate wings, causing equilibrium to be established between the wing on an exhaust port and the next following wing at the time when exhaust begins to take place.

In testimony whereof I affix my signature in presence of two witnesses.

JASPER SPEESE.

Witnesses:
  WM. BAGGER,
  H. DITTMAN.